April 5, 1966  B. G. BJALME ETAL  3,243,878
PIPE CUTTER

Filed Jan. 17, 1964  2 Sheets-Sheet 1

INVENTOR.
Bengt G. Bjalme
BY Thomas G. Brown
Ralph Hammay
Attorney

United States Patent Office 3,243,878
Patented Apr. 5, 1966

3,243,878
PIPE CUTTER
Bengt G. Bjalme and Thomas G. Brown, Erie, Pa., assignors to Reed Manufacturing Company, Erie, Pa., a corporation of Pennsylvania
Filed Jan. 17, 1964, Ser. No. 338,390
2 Claims. (Cl. 30—95)

This invention is a pipe cutter in which two or more identical sections may be connected end to end to accommodate a wide range of pipe sizes. In a preferred form, it is an improvement on Patent 3,098,296. The size adjustment is effected by notched links connecting the frame sections and by arcuate seats associated with the links and frame sections which facilitate connecting more than two frame sections end to end.

Figure 1:
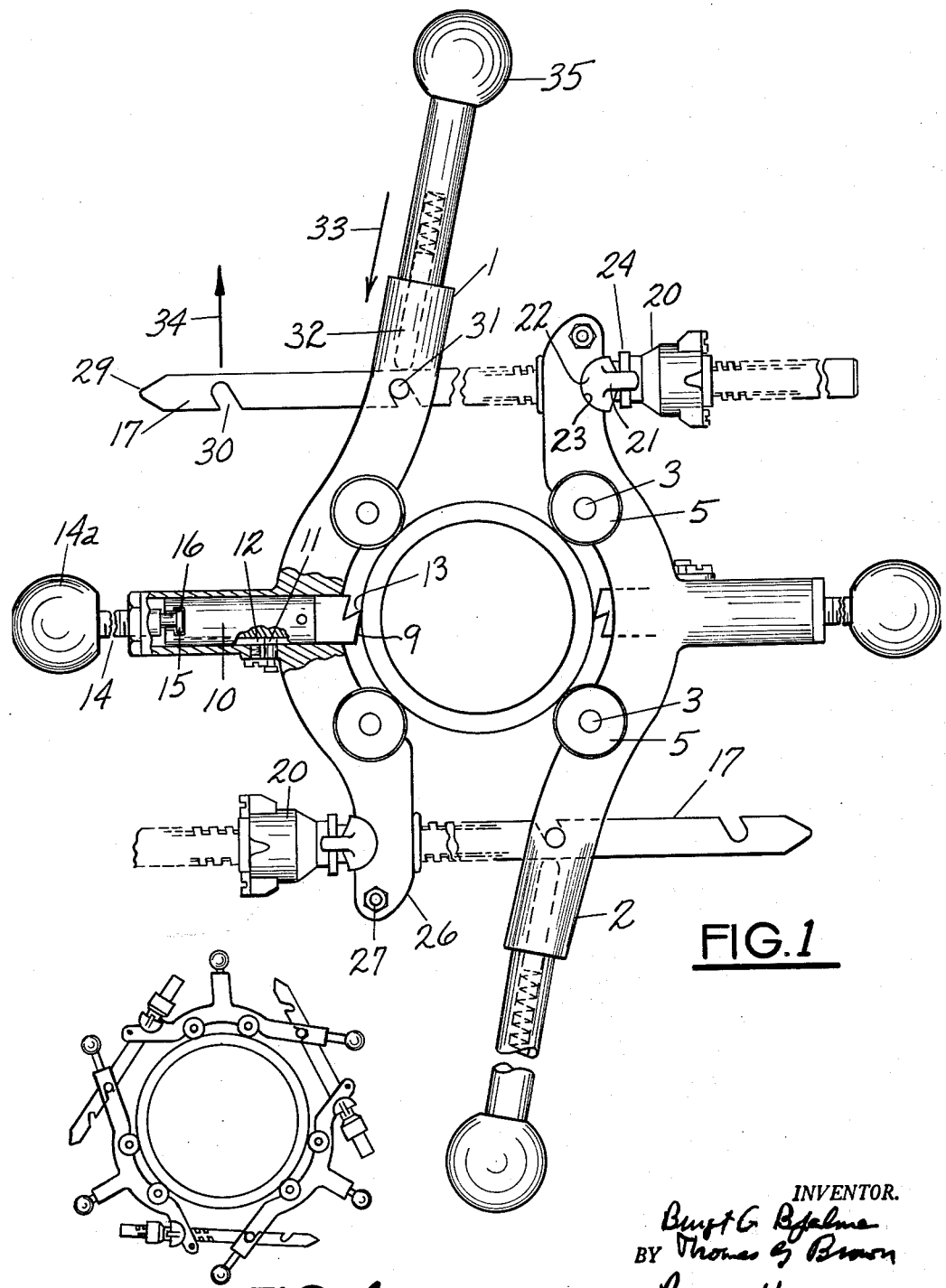
Figure 4:
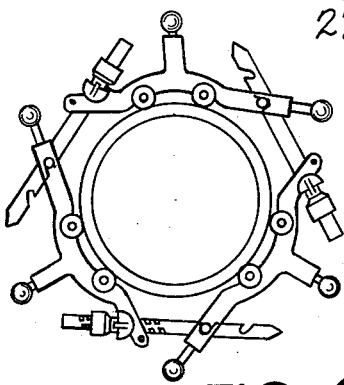
Figure 2:
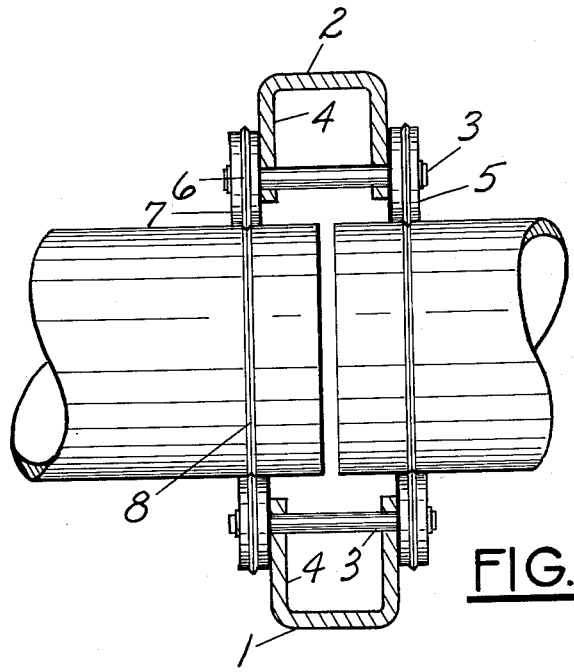
Figure 3:
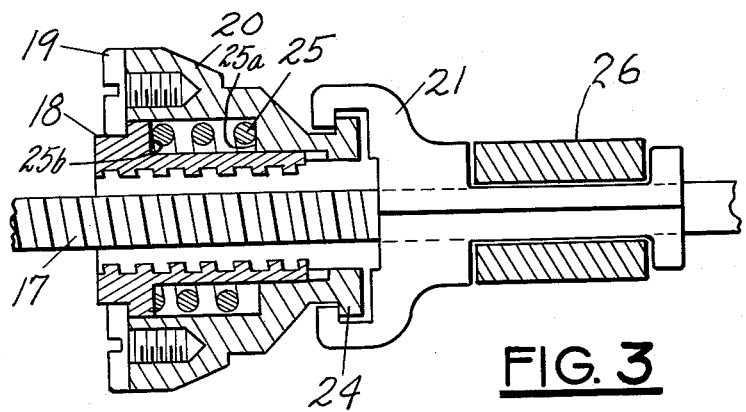

In the drawing, FIG. 1 is an end elevation of two sections of the cutter positioned on a pipe, FIG. 2 is a section on line 2—2 of FIG. 1, FIG. 3 is a section on line 3—3 of FIG. 1, and FIG. 4 is an end elevation of reduced scale showing three sections of the cutter connected end to end.

When used for the smaller sizes of pipe, the cutter has two identical frame sections 1 and 2 which, as shown in FIG. 2, are of channel section. Each frame section has two angularly spaced axles 3, non rotatably anchored in flanges 4 with the axles extending parallel to the axis of the pipe. A pair of wheels 5 are journaled on the projecting ends of each axle. The wheels of each pair are spaced apart axially the same distance and each wheel has a circumferentially projecting rib 6 projecting radially beyond a wide tread section 7. As explained in Patent 3,098,296, the ribs 6 generate centering grooves 8 in the pipe and the wide treads 7 ride on the outer surface of the pipe without substantial penetration.

The cutting of the pipe is effected by flat cutting blades 9 each fixed in a holder 10 slidably carried at the center of each of the frame sections 1 and 2. Rotation of each blade holder is prevented by a key 11 received in a keyway 12. The inner ends of the blades 9 have cutting points 13 ground to the shape required for the material of the pipe being cut. Turning of a pressure screw 14 advances or retracts the cutting blade, depending upon the direction of rotation. The circular head 15 of the pressure screw turns freely in a key slot 16 in the holder. Each pressure screw 14 has a handle 14a by which the cutter is rotated about the pipe.

The adjacent ends of the frame sections 1 and 2 are connected to each other by pivoted flat links 17, each threaded to receive a nut 18 by which the frame sections may be tightened toward each other. Each of the nuts 18 is non rotatably anchored by screws 19 in a housing or socket member 20. Force is transmitted from the frame sections to the nuts 18 through split screw retainers 21 having arcuate portions 22 seated in arcuate seats 23 in the frame sections. This permits the screw retainers 21 to pivot into alignment with the force. The screw retainers 21 bear on a flange 24 on the housing 20 and transmit force from the housing to the nut through a coil spring 25 having ends engaging opposed shoulders 25a and 25b respectively on the housing and nut. On out-of-round or irregular pipe, the springs 25 yield and prevent build-up of pressure which would make the cutter hard to operate. The split screw retainer 21 is received between the slotted end 26 of the frame section and is permanently held therein by a bolt 27.

Each link 17 has a pointed end 29 having notches 30, each adapted to receive a pin 31 anchored in the end of the frame section opposite the nut. As shown in FIG. 1, a spring pressed plunger 32 urges the link 17 in the direction of arrow 33 and holds the selected slot 30 in engagement with the pin 31. The notch 30 may be easily disengaged by moving the link in the direction of arrow 34. Only a light force is required to overcome the pressure of the plunger 32. As soon as the notch 30 is clear of the pin 31, the link may be moved lengthwise either to select a new notch for a different size of pipe or to remove the link and thereby disconnect the frame sections. The end of the frame carrying the plunger is conveniently provided with a handle 35 by which the pipe cutter may be turned.

For the smaller sizes of pipe, such as four to eight inches, two of the frame sections 1 and 2 will be used. For the larger sizes of pipe such as 8 inches to 16 inches, three of the frame sections will be used, as shown in FIG. 4. Each of the frame sections is of identical construction.

In the use of the cutter, two or three frame sections are used, depending upon the size of pipe. These frame sections are connected together end to end as shown in FIG. 1 (or FIG. 4), the connections being made by positioning the slots 30 in the links 17 in engagement with the pin 31.

After the frame sections have been connected, the sections are tightened against the pipe by turning the housings 20. After the cutter has been aligned and tightened on the pipe and is turned through its first revolution to establish the centering grooves 8, the cutting blades 9 are alternately advanced into the pipe. Usually each blade is advanced once during each revolution and the amount of advance is determined by the depth of cut. When the cut is completed, loosening one of the nuts 18 allows the frame sections to be disconnected.

What is claimed as new is:
1. In a cutter for pipe of the type comprising a plurality of frame sections arranged end to end about the pipe with adjacent ends of the frame sections spaced from each other, a pair of angularly spaced wheels journaled in each frame section between the ends thereof, a cutting tool between the wheels on at least one frame section in a plane perpendicular to the axis of the pipe, means for advancing the tool into the pipe, links connecting the adjacent ends of the frame sections, each link having a threaded end projecting through an end of one of the frame sections, and a nut screwed on the threaded end of the link and in thrust relation to the associated end of said one frame section, the improvement which comprises providing each link with a notched end opposite its threaded end, said notched end slidably projecting through an end of a frame section adjacent said one frame section, said end of the adjacent frame section having a pin receivable in a notch in said notched end of the link, and spring means biasing the notched end of the link into engagement with said pin.

2. The cutter of claim 1 in which the structure establishing the thrust relation from the nut to the associated end of said one frame section comprises a socket member rotatably receiving and in thrust relation to the nut, a retainer slidably receiving the link and having an arcuate portion seated in an arcuate seat in the frame section and having a force transmitting connection to the socket member.

(References on following page)

References Cited by the Examiner

UNITED STATES PATENTS

| | | | |
|---|---|---|---|
| 2,787,054 | 4/1957 | Franck | 30—102 |
| 3,023,655 | 3/1962 | McDaniel | 30—100 X |
| 3,098,296 | 7/1963 | Petersen | 30—95 |

FOREIGN PATENTS 643,117  9/1950  Great Britain.

WILLIAM FELDMAN, *Primary Examiner.*

MYRON C. KRUSE, *Examiner.*